United States Patent
Teicher et al.

[11] Patent Number: 5,880,449
[45] Date of Patent: Mar. 9, 1999

[54] SYSTEM AND METHOD FOR PROVIDING A STORE CUSTOMER WITH PERSONALLY ASSOCIATED PRICES FOR SELECTED ITEMS

[75] Inventors: Mordechai Teicher, Kfar Saba; Avner Halperin, Tel Aviv, both of Israel

[73] Assignee: Eldat Communication Ltd., Bnei Brak, Israel

[21] Appl. No.: 699,375

[22] Filed: Aug. 19, 1996

[30] Foreign Application Priority Data

Aug. 17, 1995 [IL] Israel .......................................... 114965

[51] Int. Cl.⁶ ..................................................... G06K 7/00
[52] U.S. Cl. ............................ 235/383; 235/375; 235/472
[58] Field of Search .................................. 235/383, 375, 235/472

[56] References Cited

U.S. PATENT DOCUMENTS

| | | | |
|---|---|---|---|
| 4,002,886 | 1/1977 | Sundelin | 235/383 |
| 4,139,149 | 2/1979 | Crepeau et al. | 235/383 |
| 4,521,677 | 6/1985 | Sarwin | 235/385 |
| 4,766,295 | 8/1988 | Davis et al. | 235/383 |
| 5,019,811 | 5/1991 | Olsson et al. . | |
| 5,055,660 | 10/1991 | Bertagna et al. | 235/472 |
| 5,250,789 | 10/1993 | Johsen | 235/383 |
| 5,313,569 | 5/1994 | Olsson et al. | 395/118 |
| 5,388,165 | 2/1995 | Deaton et al. . | |
| 5,430,644 | 7/1995 | Deaton et al. | 364/701 |
| 5,468,948 | 11/1995 | Koenck et al. | 235/472 |
| 5,478,989 | 12/1995 | Shepley | 235/375 |
| 5,548,282 | 8/1996 | Escritt et al. | 235/383 |
| 5,557,088 | 9/1996 | Shimizu et al. | 235/383 |
| 5,572,653 | 11/1996 | DeTemple et al. | 395/501 |
| 5,592,560 | 1/1997 | Deaton et al. | 235/375 |
| 5,635,915 | 6/1997 | Gray | 235/383 |

FOREIGN PATENT DOCUMENTS

| | | | |
|---|---|---|---|
| 9002296 | 5/1992 | Netherlands . | |
| 002244839 | 12/1991 | United Kingdom | 235/383 |
| 002251969 | 7/1992 | United Kingdom | 235/383 |
| 9008440 | 7/1990 | WIPO . | |

*Primary Examiner*—Anita Pellman Gross
*Assistant Examiner*—Douglas X. Rodriquez
*Attorney, Agent, or Firm*—McDermott, Will & Emery

[57] ABSTRACT

A system and method for granting a customer visiting a store with personally associated prices for selected items is provided. The customer receives a portable customer unit which communicates with a check-in unit for establishing personal prices for selected items. In one preferred embodiment the personal prices are then downloaded into the portable customer unit, and in an alternative embodiment the identity of the portable customer unit and the respective reduced price is then downloaded into the shelf labels whose price is reduced. During shopping, the customer unit transmits coded signals to the electronic shelf labels. Electronic shelf labels respective to items whose code is included in the items for which a personal price is effective respond with an eye-catching signal to attract the customer's attention.

18 Claims, 8 Drawing Sheets

SYSTEM AND METHOD FOR PROVIDING A STORE CUSTOMER WITH PERSONALLY ASSOCIATED PRICES FOR SELECTED ITEMS

FIELD OF THE INVENTION

The present invention relates to a sales promotion system operative in conjunction with an electronic shelf-labeling system.

FIELD AND BACKGROUND OF THE INVENTION

Sales promotion is a well-known retail technique, aiming at increasing revenues, attracting customers, encouraging purchase at certain hours, accelerating the sales of manufacturer-promoted products, reducing the inventory of rapidly-aging or slow-selling products and the like. An effective sales-promotion method is the Sale, which is a temporary price-reduction on specified items. Sales prove to attract customers, boost purchase of on-Sale items and create an atmosphere which encourages purchase of other items as well.

A typical store comprises a store computer system having therein inventory and price information, communicating with a number of points of sale (POS) which identify the items included in a purchase, calculate their price and collect payment. Items offered for sale are usually displayed on shelves, and a shelf label with price information relating to each group of identical items is usually positioned adjacently to each such group. Electronic shelf labels are shelf labels communicating with the store computer system for synchronizing the information displayed thereon with the prices charged at the POS. Electronic shelf labels are deployed commercially and are described in a number of U.S. Pat. Nos. (e.g. 4,002,886, 4,139,149, 4,521,677, 4,766, 295, 5,019,811 and 5,313,569.). The communication between the store computer and the electronic shelf labels uses hard wiring or wireless communication links.

OBJECT AND BRIEF SUMMARY OF THE INVENTION

An object of the present invention is to introduce a sales promotion system based on the concept of a "Personal Sale" wherein personal prices for selected items is offered to a customer upon his entrance to the store.

Another object of the present invention is not to reveal part or all of the details of the selected items and their special prices to the customer, and to provide him with a portable customer unit allowing him to communicate with electronic shelf labels to identify on the shelves the specially priced items and/or retrieve information relating to the price on each such item.

A retail store operative with the present invention comprises a store computer system having therein price information, a number of points of sale (POS) connected to the store computer system and a plurality of electronic shelf labels communicating with the store computer system, preferably via a wireless link, e.g. an infrared (IR) link.

According to the present invention, a customer visiting a store receives at the entrance a portable customer unit which communicates with a check-in unit for establishing personal prices for selected items. In one preferred embodiment the personally associated prices for selected items is then downloaded into the portable customer unit, and in an alternative embodiment the identity of the portable customer unit and the respective reduced price is then downloaded into the shelf labels whose price is reduced. During shopping, the customer unit transmits coded signals to the electronic shelf labels. Electronic shelf labels respective to items whose code is included in the selected items respond with an eye-catching signal to attract the customer's attention. When approaching the signaling electronic shelf label, the customer may read on the label the details of the special price offered to him. Upon presenting the customer unit at the point of sale, the customer is charged for the selected items with the corresponding personal price.

There is thus provided, in accordance with a preferred embodiment of the present invention, a system for providing a customer within a store with personally associated prices for selected items. The system includes a portable unit associated with the customer and at least one point of sale for collecting payment for the customer's purchases. The portable unit is operative to obtain the personally associated prices for selected items. The point of sale collects payment for the customer's purchases and the point of sale interfaces with the portable unit to calculate payment in accordance with the personally associated prices for selected items.

Furthermore, in accordance with a preferred embodiment of the present invention, the system further includes a plurality of electronic shelf labels each of which display information associated with one of the store's items. The portable unit communicates with electronic shelf labels associated with the selected items to temporarily change the displayed information according to the personally associated prices for the selected items.

Furthermore, in accordance with a preferred embodiment of the present invention, the electronic shelf labels include means to attract the customer's attention to the selected items.

Furthermore, in accordance with a preferred embodiment of the present invention, the system also includes a store computer operative to select the selected items and to generate the personally associated prices.

Furthermore, in accordance with a preferred embodiment of the present invention, the store computer is operative to select the selected items and to generate the personally associated prices in accordance with data related to the customer's past purchase record.

Furthermore, in accordance with a preferred embodiment of the present invention, the store computer is operative to store the generated personally associated prices for selected items for each of the store's customers.

Furthermore, in accordance with a preferred embodiment of the present invention, the store computer is operative to store general data related to each of the store items and to communicate with each of the electronic shelf labels to download general data respective to each of the store items.

Furthermore, in accordance with a preferred embodiment of the present invention, the store computer is operative to communicate with each of the electronic shelf labels of the selected items to download thereto the identity of the portable unit and the respective personally associated prices.

Additionally, in accordance with a preferred embodiment of the present invention, the system also includes at least one check-in unit coupled to the computer system wherein each check-in unit is operative to communicate with the portable unit to download the personally associated prices for selected items.

Additionally, in accordance with a preferred embodiment of the present invention, the system also includes at least one customer interface unit, operative to communicate with the store computer and to receive input from the customer to thereby affect the generation of the personally associated prices for selected items.

Furthermore, in accordance with a preferred embodiment of the present invention, the portable unit communicates with the point of sale to upload the personally associated prices for selected items.

Furthermore, in accordance with a preferred embodiment of the present invention, the portable unit communicates with the at least one point of sale to transmit its identity.

Furthermore, there is also provided in accordance with a preferred embodiment of the present invention, a method for providing a customer at a point of sale within a store with personally associated prices for selected items. The method includes the steps of:

A. generating the personally associated prices for selected items, for the customer;
B. automatically displaying the personally associated prices on electronic shelf labels to the customer; and
C. upon completion of purchase, charging the customer in accordance with the personally associated prices for selected items purchased.

Furthermore, in accordance with a preferred embodiment of the present invention, the step of displaying includes the step of generating an eye catching signal to attract the customer's attention.

Additionally, in accordance with a preferred embodiment of the present invention, the method also includes the steps of:

D. providing the customer with a portable unit; and
E. upon completion of purchase, charging said customer with said personally associated prices upon presentation of said portable unit.

Additionally, in accordance with a preferred embodiment of the present invention, the method also includes the step of storing the personally associated prices for selected items in the store's computer.

Additionally, in accordance with a preferred embodiment of the present invention, the method also includes the steps of:

F. downloading item-specific information to each of a plurality of electronic shelf labels, wherein each of the electronic shelf labels is associated with one of the store's items;
G. displaying the item-specific information on the respective electronic shelf label; and
H. temporarily changing the information displayed on the respective electronic shelf label to the personally associated prices for selected items upon receiving a communication from the portable unit.

Additionally, in accordance with a preferred embodiment of the present invention, the method also includes the steps of:

I. providing the portable unit with personal identification;
J. communicating the personal identification and the personally associated prices for the respective selected items to each of the respective electronic shelf labels; and
K. temporarily changing the displayed information on the respective electronic shelf label to display the personally associated prices upon the portable unit communicating the personal identification.

Additionally, in accordance with a preferred embodiment of the present invention, the method also includes the steps of:

L. downloading the personally associated prices to the portable unit;
M. the portable unit communicating the personally associated prices for the respective selected items to each of the respective electronic shelf labels; and
N. temporarily changing the displayed information on the respective electronic shelf label to display the personally associated prices upon receiving a communication of the personally associated prices from the portable unit.

BRIEF DESCRIPTION OF THE DRAWINGS

The present invention will be understood and appreciated more fully from the following detailed description taken in conjunction with the drawings in which.

DESCRIPTION OF THE PREFERRED EMBODIMENTS

Figure 1:
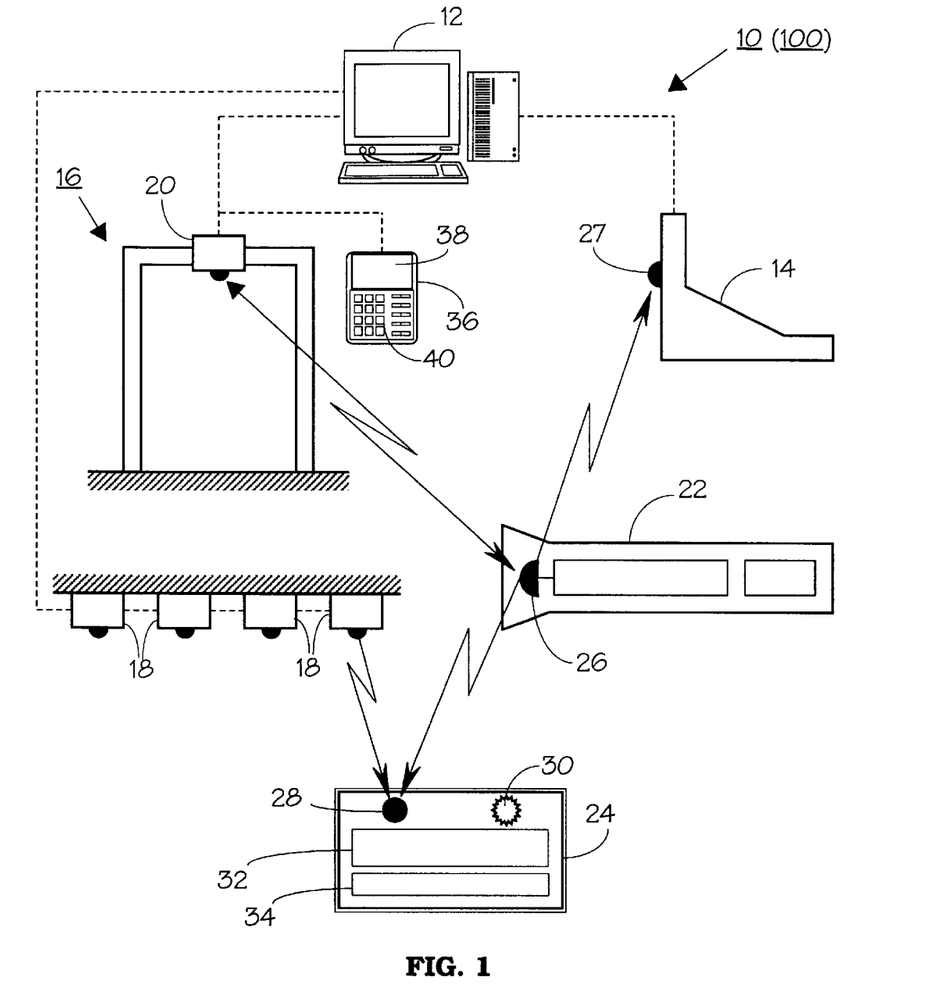
FIG. 1 describes the general layout of a sales promotion system constructed and operative in accordance with the present invention.

Reference is made to FIG. 1, which illustrates the general layout of a sales promotion system, generally designated 10, constructed and operative in accordance with a preferred embodiment of the invention. The sales promotion system 10 comprises a store computer 12 communicating with a plurality of points of sale (POS), generally designated 14, one or more check-in units, referenced 16 and a plurality of infrared (IR) transmitters, generally designated 18.

Sales promotion system 10 further comprises customer units, generally designated 22 and a multiplicity of electronic shelf labels 24.

Each check-in unit 16 comprises a check-in infrared transceiver 20 which identifies the individual customer units 22 and which transmits the customer-specific price-reduction lists thereto.

Each POS 14 comprises a receiver 27 for receiving signals from the transceiver 26 of customer unit 22.

Store computer 12 is a typical computer system which contains, inter alia, general data and procedures regarding inventory, prices and store management. In addition, store computer 12 contains information and data specifically relating to the stores sales promotions, such as details regarding price-reductions. A description of the price-reduction lists and the procedure for operating the sales promotion system are described hereinbelow with reference to FIGS. 4A and FIG. 8, respectively.

Infrared transmitters 18 relay addressed messages from store computer 12 to the multiplicity of electronic shelf labels 24. Each customer is issued with a personal customer unit 22 which comprises a transceiver 26 which receives messages, such as a list of price reductions from the store computer system 12. The received list of price reductions, maybe general or specific to a particular customer. The customer uses his customer unit 22 to transmit a signal to any electronic shelf labels 24 of interest.

Having completed his purchases, the customer unit 22 is used to communicate with POS 14 to identify the customer and his corresponding personal price-reduction list. The POS 14 automatically credits the customer with any reductions due him if he has purchased any of the specific items on his price reduction list.

Each electronic shelf label 24 comprises an infrared receiver 28, a blinker 30, a display ticket 32 and a product sticker 34.

Infrared receiver 28 receives general price information from IR transmitters 18 and personal sales information from the customer units 22. Blinker 30 transmits a visible, eye-catching signal to attract the customer's attention to items on special offer. Display ticket 32 displays detailed price and sale information about a product and product sticker 34 contains product identification information to associate the electronic shelf label with the related product on the shelf.

In an alternative embodiment, the sales promotion system 10 further comprises a customer interface unit 36, which typically comprises a display and keypad, 38 and 40, respectively. Customer interface unit 36 allows the customer to interface with the store computer system 12 and, for example, allows him to express his preferences, or specify particular store departments of interest to him, as well as to receive information about his personal price-reduction list. Customer interface unit 36 may also include a card reader, to identify the customer through his credit card or store member card, allowing the store computer keep track of the customer's purchases and customize the downloaded price-reduction list according to the customer's past purchase pattern. Alternatively, the customer's purchase pattern can be recorded and maintained on the card or in the portable unit, if such unit is personal to a customer.

Figure 2:
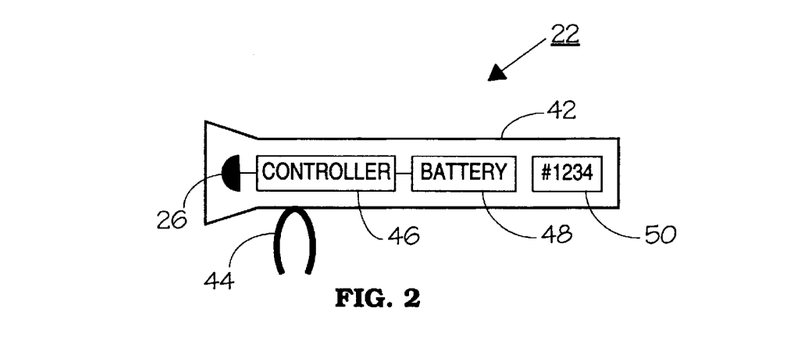
FIG. 2 is a schematic block diagram illustration of a portable customer unit operative with the sales promotion system of FIG. 1.

Reference is now made to FIG. 2, which is a schematic diagram of customer unit 22. Customer unit 22 further comprises a housing 42 having a clip 44 attached thereto, a controller 46, a power supply, such as a battery, 48 and an identification (ID) label 50.

Housing 42 is shaped to allow for convenient holding of customer unit 22 by the customer, while clip 44 allows the customer unit 22 to be attached to a shopping cart, for example. Controller 46 controls the transmission, reception and storage of information and is described in further detail hereinbelow, with respect to in FIG. 3. Battery 48 energizes controller 46 and transceiver 26. ID label 50 displays visible identification information unique to each unit 22.

Figure 3:
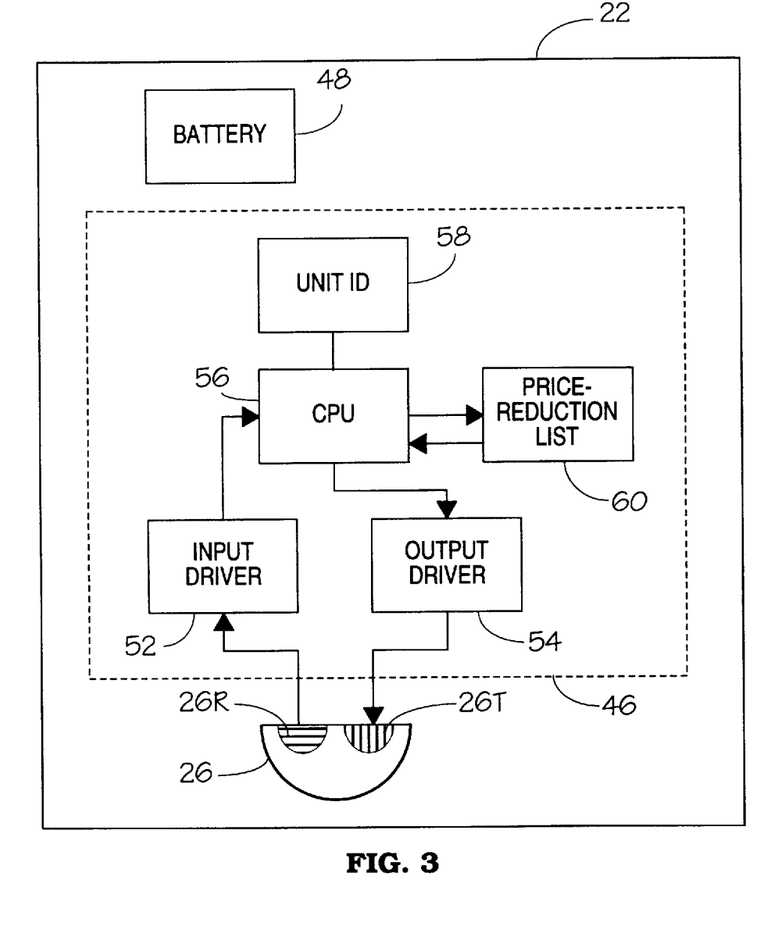
FIG. 3 is a block diagram of illustration of the components of the portable customer unit of FIG. 2.

Reference is now made to FIG. 3, which is a block diagram illustration of the components of customer unit 22. Battery 48 energizes all the components of the controller 46 of customer unit 22, and transceiver 26 described below.

Controller 46 comprises an input driver 52, an output driver 54, a processing unit (CPU) 56, an unit ID register 58 and a storage register 60.

Processing unit (CPU) 56 controls the information flow from and to input and output drivers 52 and 54, respectively, the storage and retrieval of information, such as, the customer-specific price-reduction list and the retrieval of the unit's ID from ID register 58. ID register 58 electronically contains the unit's ID which is unique to each customer unit 22. The unit's ID is also visibly displayed on ID label 50 (FIG. 2). Storage register 60 stores the customer-specific price-reduction list, described hereinbelow with respect to FIG. 4B, which is received from the check-in transceiver 12 of FIG. 1 during entrance to the store.

Infrared transceiver 26 comprises an IR receiver, referenced 26R and an IR transmitter, referenced 26T. IR receiver 26R converts received infrared signals into electrical pulses which are then sent to input driver 52. IR transmitter 26T converts electrical signals received from output driver 54 into infrared signals for onward transmission.

Input driver 52 transforms the electrical signals received from infrared receiver 26R into coded signals, e.g. using ASCII codes, which are also stored at storage register 60. Output driver 54 converts coded information retrieved by CPU 56 from registers 58 and 60 into infrared pulses complying with protocols of IR receiving units 20, 27 and 28.

Figure 4A:
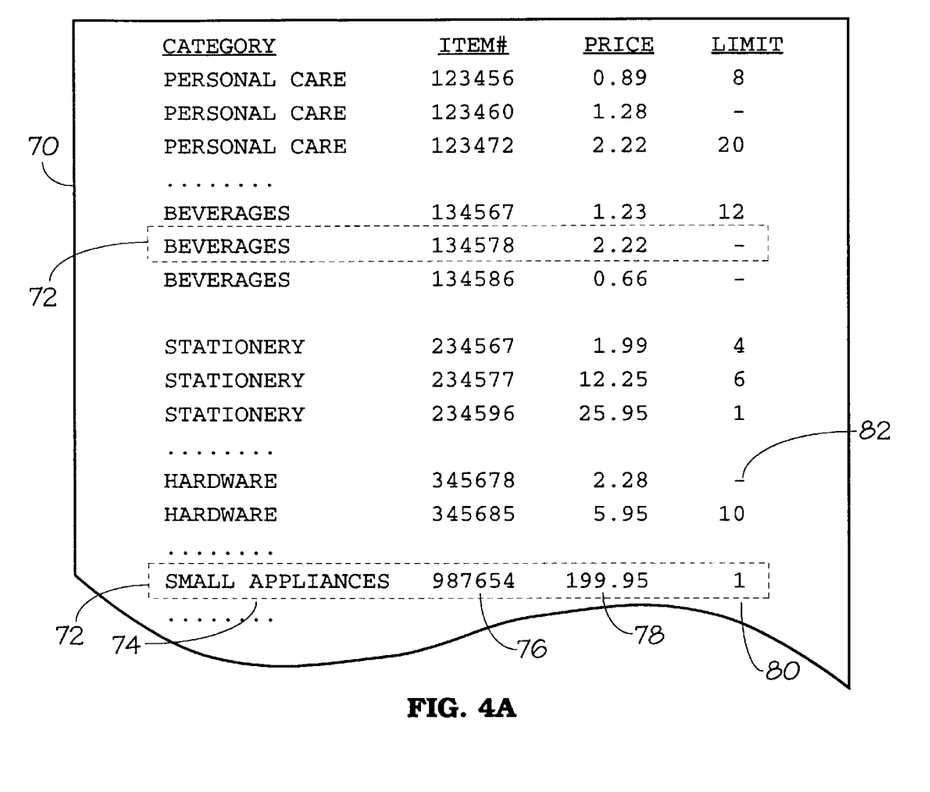
FIG. 4A is an illustration of part of a comprehensive price reduction list in tabular format.

Reference is now made to FIG. 4A, which illustrates, in tabular format, part of a comprehensive list of the store's price-reductions, generally designated 70. List 70 is stored within store computer system 12. List 70 is generally prepared by the store manager according to various considerations, similar to those governing price-reductions in conventional sales. List 70 comprises a record of each item 72. Each item record 72 includes information regarding category 74, item code number 76, reduced price 78 and quantity limit 80. The quantity limit 80 defines the number of items which are allowed to be purchased under the personal reduced price. Unlimited purchases are indicated by "-" (82).

Figure 4B:
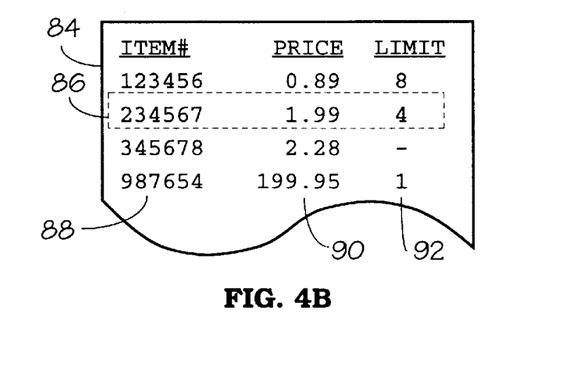
FIG. 4B describes a personal price-reduction list downloaded to and stored in the portable customer unit.

Reference is now made to FIG. 4B, which illustrates a customer-specific price-reduction list 84. The customer-specific price-reduction list 84, which is stored in storage register 60 of the customer unit 22 (FIG. 3), defines the specific items which are on offer (or sale) for the customer having the specific customer unit 22. Customer-specific price-reduction list 84 is downloaded to the customer unit 22 when entering the store and is assigned to the customer according to the operational procedure, described hereinbelow with reference to FIG. 8. The specific price-reduction list 84, which is a subset of list 70, comprises a record of items 86, each item comprising a code number 88, its reduced price 90 and quantity limit 92. The code number 88, reduced price 90 and quantity limit 92 are identical to item code number 76; reduced price 78 and quantity limit 80 described with respect to FIG. 4A.

Figure 5:
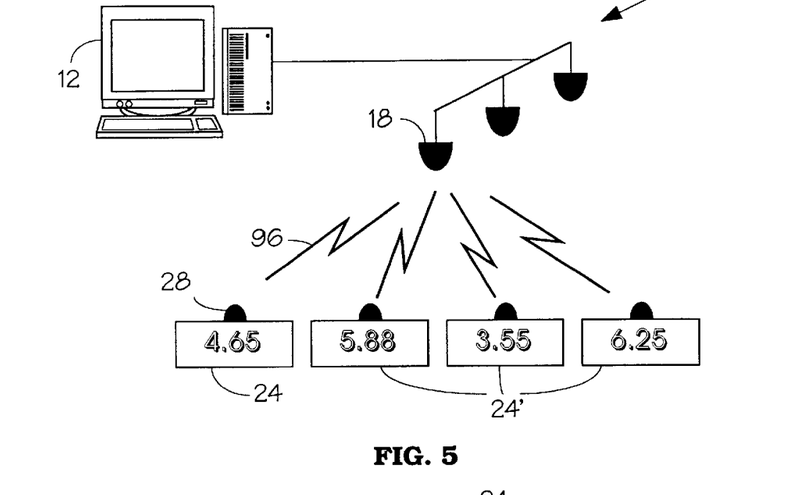
FIG. 5 is a schematic block diagram illustration of an electronic shelf labeling system.

Reference is now briefly made to FIG. 5, which is a schematic block diagram of an IR electronic shelf labeling system 94. The IR electronic shelf labeling system 94, which is any IR electronic shelf labeling system known in the art, comprises a store computer 12 which transmits, via IR transmitters 18 scattered throughout the store, signals 96 addressed to electronic shelf labels 24. Shelf labels 24 receive the addressed signals 96 via their infrared receivers 28. Only a shelf label 24 whose address matches the address included in the transmitted signal 96 will react to the information contained within the specific signal 96. Since the information within signal 96 is specific to a particular label, other labels, referenced 24' receiving the signal 96 are not affected.

Figure 6A:
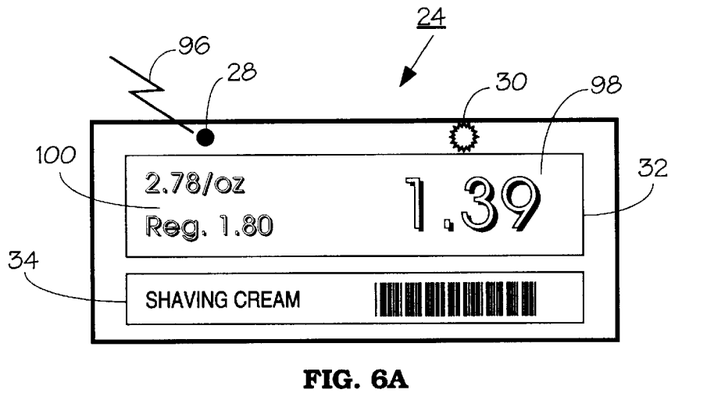
FIG. 6A is a general view of an electronic shelf label displaying general price information.

Reference is now made to FIG. 6A, which is a schematic illustration of an electronic shelf label 24, constructed and operative in accordance with a preferred embodiment of the present invention. IR receiver 28 receives information 96 addressed to the specific label 24, which is stored therein and displayed on display ticket 32. The label 24 may include any information as required, such as the general price 98 and other descriptive information 100. Normally, blinker 30 is switched off. If the item is included in a general sale, that is a sale which affects all customers in the store and is not part of the personal customer-specific list 84, then this indication of a "general sale" can be displayed as part of the descriptive information 100. In this case, blinker 30 can be operated to transmit an eye-catching signal which is characteristic to "general sales". Product sticker 34 identifies the relevant item and thus, avoids ambiguity where many item groups and their respective electronic shelf labels are placed adjacent to or in close proximity to each other.

Figure 6B:
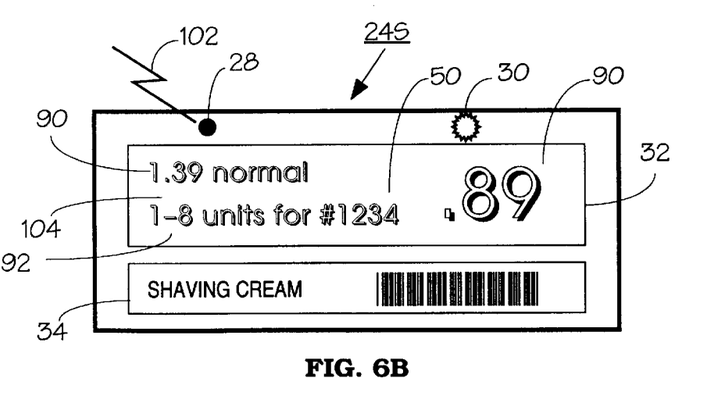
FIG. 6B is a general view of an electronic shelf label displaying personalized sale information.

Reference is now made to FIG. 6B which describes the appearance of electronic shelf label 24 which receives a signal 102 addressed to a specific label, referenced 24S, transmitted by a customer's unit 22. The signal 102, transmitted by the customer unit 22, includes the item's record details 84 (FIG. 4B) as well as the unit's ID stored in ID register 58 (FIG. 3). The display ticket 32 changes temporarily to display customer-specific descriptive information 104, such as the reduced price 90 and the quantity limit 92. The customer's ID number 50 is also displayed to prevent ambiguity in case two customers approach the electronic shelf label at the same time. Blinker 30 now transmits a different eye-catching signal to indicate a "personal" or customer-specific sale item.

Figure 7:
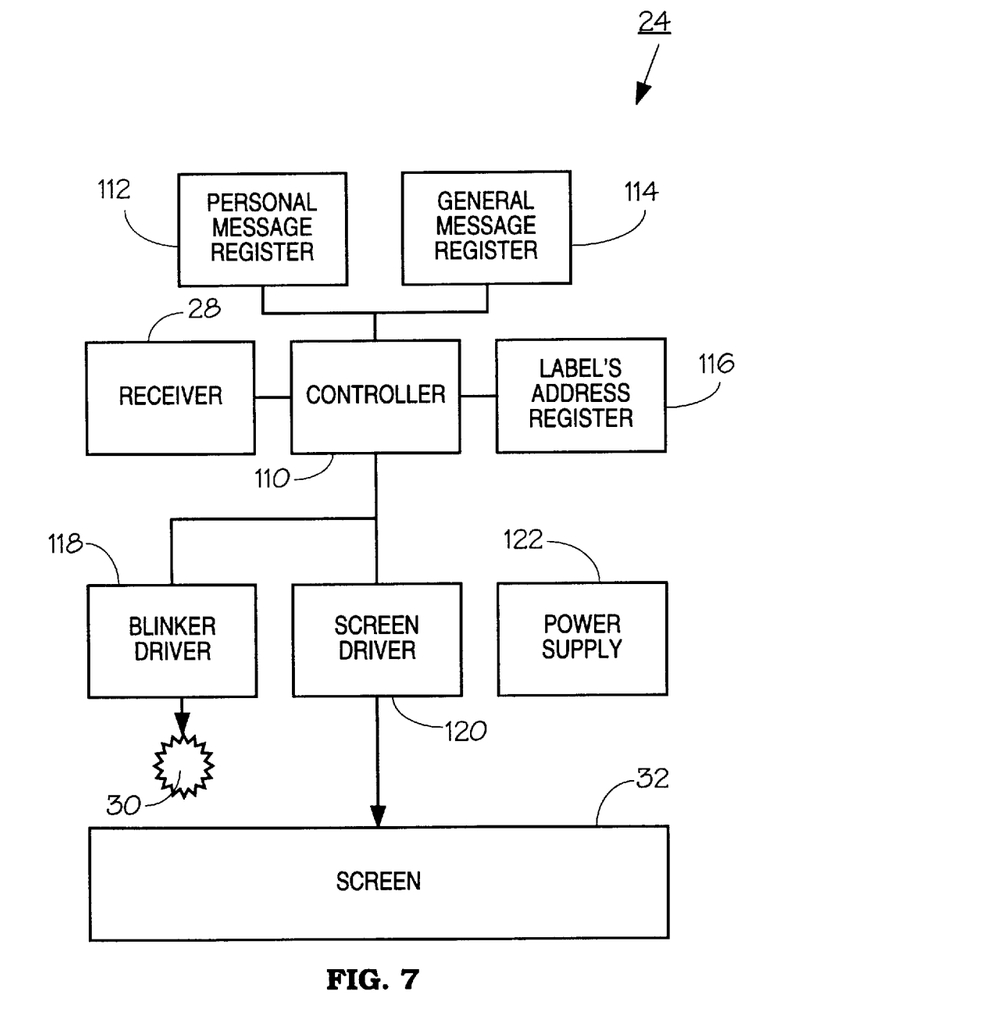
FIG. 7 is a schematic block diagram illustration of an electronic shelf label.

Reference is now made to FIG. 7, which is a schematic block diagram illustration of electronic shelf label 24. Label 24 further comprises a controller 110, a personal message register 112, a general message register 114, a label address register 116, a blinker driver 118, a screen driver 120 and a power supply 122.

The IR receiver 28 receives IR signals 96 and 102 transmitted by the store computer 12 and customer unit 22, respectively and relays them to controller 110. The controller 110 compares the address embedded in each signal with the electronic label's address stored in register 116. If the address does not match, the message is ignored. If the message is addressed to the specific electronic shelf label 24, its contents are stored in either the general message register 114 (if it is identified as a message 96 from IR transmitters 18), or in personal message register 112 (for messages 102 received from a customer unit 22). In the latter case, the message will contain the portable unit's ID 50.

The general message from the store's computer 12 is the default display appearing on the electronic shelf label 24. Controller 110 selects the message from general message register 114 and by means of screen driver 120 and blinker driver 118 displays the message on screen 32 and operates blinker 30, respectively.

However, on receipt of a signal 102 addressed to electronic shelf label 24 from the customer unit 22, controller 110 selects the personalized information from personal message register 112 and, by means of screen driver 120, displays this personal message on screen 32. Blinker 30 is operated by blinker driver 118 accordingly, that is to indicate a "personal sale". Power supply 122, preferably a battery, energizes all of the elements of electronic shelf label 24.

Optionally, a predetermined time delay can be programmed into controller 110 to ensure that the display remains stabilized on receipt of a multitude of concurrent signals or a rapid succession of consecutive signals.

Figure 8:
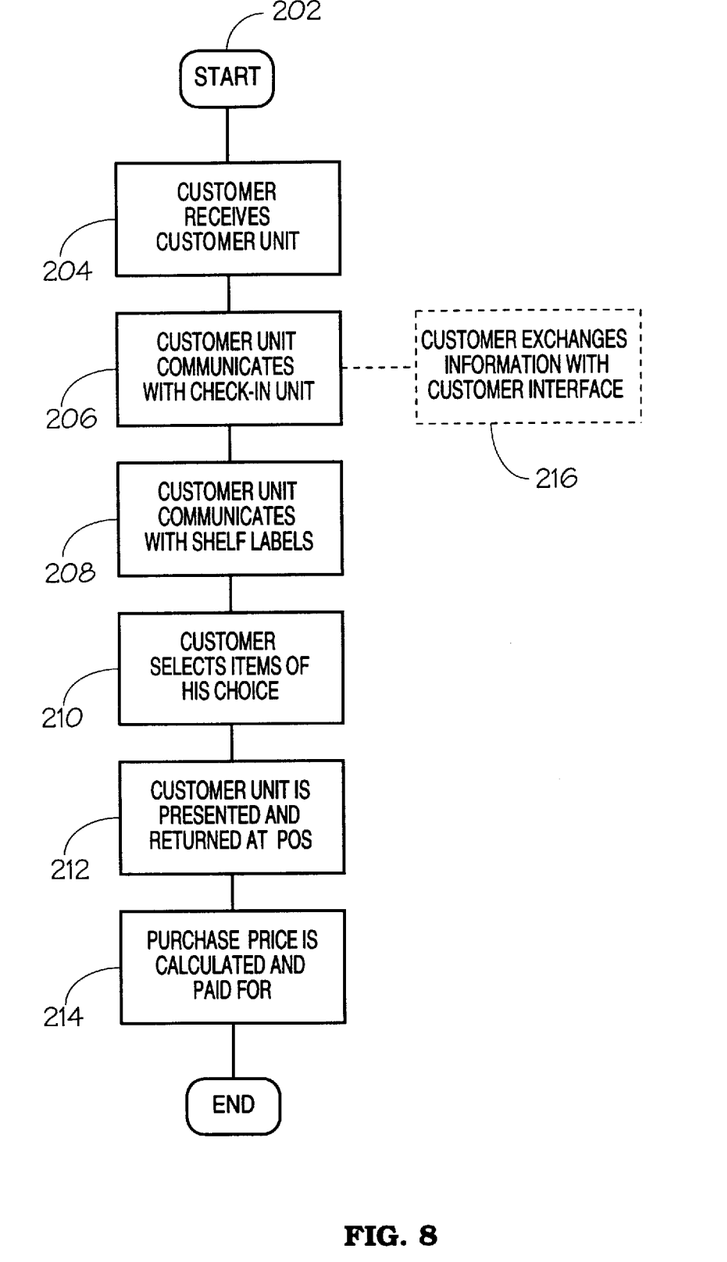
FIG. 8 is a flow chart illustration of the operational procedure of the sale promotion system of FIG. 1.

Reference is now made to FIG. 8, which is a flow chart representation of the operational procedure of the sales promotion system 10.

When a customer approaches the store entrance (step 202), he is prompted to pick up a customer unit 22 and may read general information regarding its usage. The customer receives his personal customer unit 22 (step 204), having an ID label 50 which is electronically stored in register 58. As the customer passes a check-in transceiver 20, his unit 22 communicates with it (step 206). First unit 22 transmits its ID 50 (from register 58). The store computer system 12 then randomly selects a subset of records from the list 70 and transmits the data, in the form of price-reduction list 84, to customer unit 22.

The customer unit 22 is now "loaded" with a personal price-reduction list 84, the details of which are unknown to the customer. As the customer moves around the store, his unit 22 continuously transmits the personal price-reduction list 84 in the form of messages (step 208). Each message includes for all items in the list 84 the item's code 88, the reduced price 90, the purchase limit 92 (described hereinabove with reference to FIG. 4B) and the unit's ID 50 (stored in register 58 (FIG. 3)). Electronic shelf labels 24 having a matching address (stored in register 114 (FIG. 7)) which matches the contents of item 88, respond by transmitting an eye catching signal characteristic to a "personal sale" and changing the displayed information, as described hereinabove with respect to FIGS. 6B and 7.

The customer selects items of his choice (step 210), which may included items listed in his price-reduction list. Having completed his purchases the customer approaches a POS 14, where he presents his unit to receiver 27 and returns the unit to the cashier (step 212). The unit's ID serves to retrieve the approved reduced price list from the store's computer system 12. This information is used by the POS 14 to calculate the customers bill and charge the customer the reduced prices for purchases made in accordance with his personal list (step 214).

In an alternative embodiment, where the customer is also issued with a customer interface unit 36, the customer has the option of using customer interface unit 36 to express his preferences (step 216). Information input by the customer is utilized by store computer system 12 to selectively determine the contents transmitted to the customer unit 22 (step 206).

For example, customer interface unit 36 may include a card reader to identify the customer by his credit card or store member card, which actuates a lookup procedure at store computer system 12 to identify the customer. The store computer system 12 can identify the customer's past purchase patterns (such as, baby-related items) and by optionally also taking into account the customer's expressed preferences (for example, hardware items), the store computer system 12 can adapt the items on the personal price-reduction list 84 accordingly.

The use of a customer interface unit 36 furthermore allows the store to provide numerous other marketing opportunities, such as "treasure hunting". Clues about the departments included in the personal price-reduction list 84 can be shown on the interface unit's display screen 38. For example, a display such as, "look for surprises at the beverage and stationery departments . . . " will direct the customer to a specific area of the store.

A second preferred embodiment of a sales promotion system, referenced 100, will now be described. Sales promotion system 100 is similar to sales promotion system 10, described hereinabove with reference to FIGS. 1–8. Elements having similar functions are identified with similar numerals and will not be further described.

Reference is now made to previously described FIGS. 1, 2 and 7 which are also relevant to sales promotion system 100. FIG. 1 is a general layout of sales promotion system 100. FIG. 2 is a schematic diagram of customer unit 22. FIG. 7 is a schematic block diagram illustration of electronic shelf label 24.

Briefly, sales promotion system 100 comprises a store computer 12 communicating with a plurality of points of sale (POS), generally designated 14, one or more check-in units, referenced 16 and a plurality of infrared (IR) transmitters, generally designated 18. Sales promotion system 100 further comprises customer units, generally designated 22 and a multiplicity of electronic shelf labels 24.

Each check-in unit 16 comprises a check-in infrared transceiver 20 which identifies the individual customer units 22 and which transmits the customer-specific price-reduction lists thereto. Each POS 14 comprises a receiver 27 for receiving signals from the transceiver 26 of customer unit 22.

Figure 9:
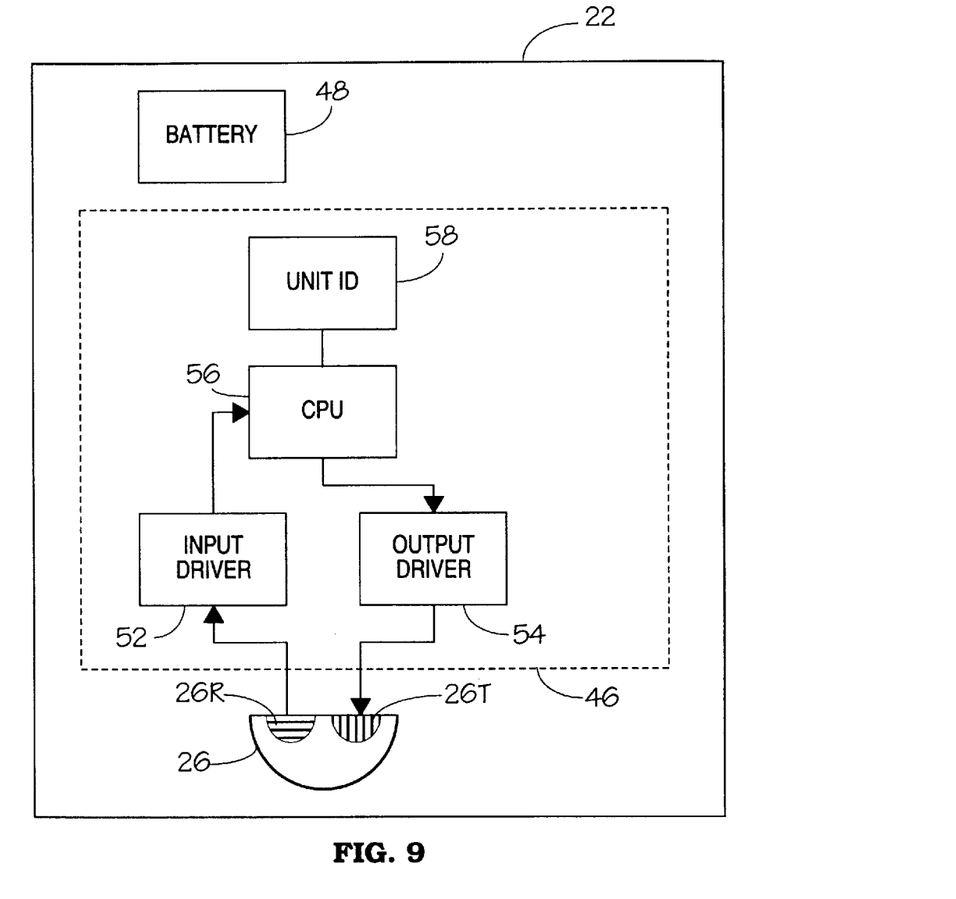
FIG. 9 is a block diagram of illustration of the components of the portable customer unit constructed and operative in accordance with a second embodiment of the invention.

Reference is now made to FIGS. 2 and 9, which illustrate customer unit 22 (FIG. 2). Customer unit 22 comprises a housing 42 having a clip 44 attached thereto, a controller 46, a power supply, such as a battery, 48 and an identification (ID) label 50.

Controller 46 comprises an input driver 52, an output driver 54, a processing unit (CPU) 56 and an unit ID register 58. In other words, FIG. 9 is similar to FIG. 3 except that the customer unit 22 lacks a storage register thus saving space.

Figure 10:
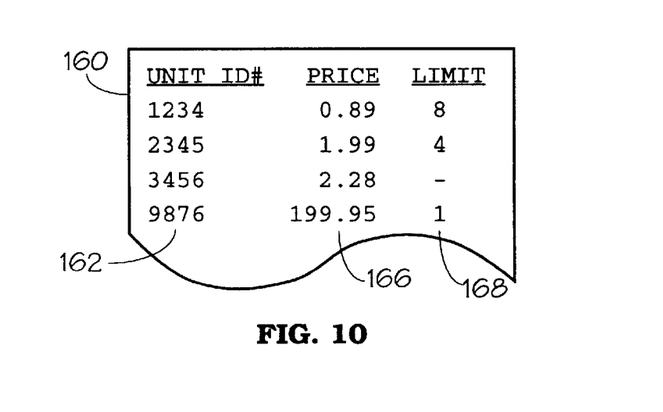
FIG. 10 is a general view of an electronic shelf label displaying personalized sale information in accordance with a second embodiment of the invention.

Reference is now made to FIG. 10 which is an illustration in tabular form of a price reduction list, referenced 160. In this embodiment, instead, of storing a price reduction list (such as list 84, described in FIG. 4B) in a storage register, price reduction list 160 is downloaded to personal message registers 112 of shelf labels 24 (FIG. 7), by store computer system 12 via infrared transmitters 18.

Price reduction list 160 comprises a record of items 162, each item comprising the customer unit's ID number 164, its reduced price 166 and quantity limit 168. The reduced price 166 and quantity limit 168 are identical to reduced price 90 and quantity limit 92 described with respect to FIG. 4B. Each item 162 is added to the personal message register 112 of the respective shelf label 24 identified by the item #76 (FIG. 4A).

Figure 11:
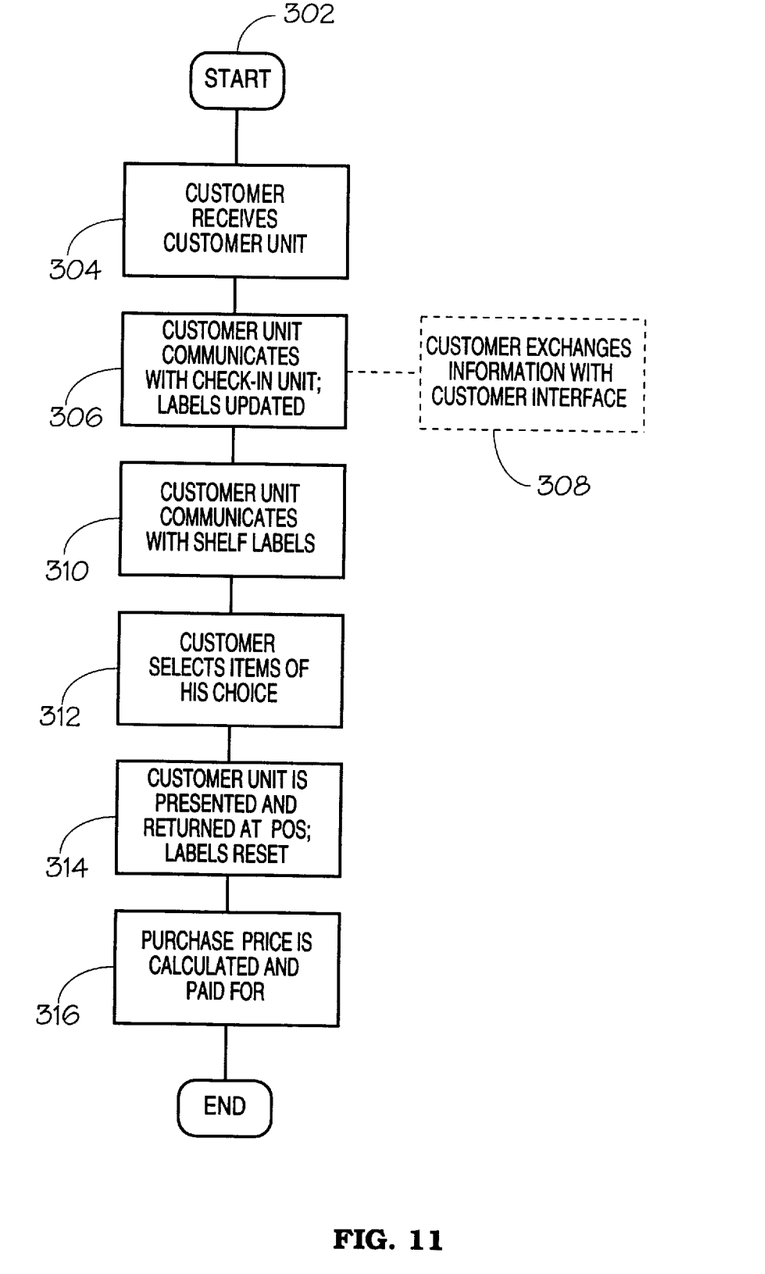
FIG. 11 is a flow chart illustration of the operational procedure of a sales promotion system, constructed and operative in accordance with the present invention.

Reference is now made to FIG. 11, which is a flow chart representation of the operational procedure of the sales promotion system 100.

When a customer approaches the store entrance (302), he receives his personal customer unit 22 (step 204), having an ID label 50 which is electronically stored in register 58. As the customer passes a check-in transceiver 20, unit 22 identifies itself and triggers the generation of a personal price-reduction list 160 by the store computer system 12 (step 306). In an alternative embodiment where the customer can use an interface unit 36, the customer optionally exchanges information with the store computer system 12 (step 308), as described hereinabove.

The personal price-reduction list 160 is not downloaded to customer unit 22, but it instead is transmitted through IR transmitters 18 to the electronic shelf labels 24, together with the customer unit ID 58 (FIG. 10). In this embodiment, when controller 110 receives the price-reduction list 160, it only selects items whose item number 88 (FIG. 4B) matches the label's ID 164, stored in register 116.

As the customer moves around the store (step 308), his unit 22 continuously transmits its ID number 50 to shelf labels 24 in the vicinity. The shelf's controller 110 compares the unit's ID 50 to the unit ID 164 stored in register 112. If a match is found, blinker 30 is actuated and display 32 shows price and limit information retrieved from list 160 (FIG. 4C).

The customer selects items of his choice (step 310). Having completed his purchases the customer approaches a POS 14, where he presents his unit 22 to receiver 27 and returns the unit to the cashier (step 312). The unit's ID serves to retrieve the approved reduced price list 84 (FIG. 4B) from the stores computer system 12. The store's computer system 12 communicates with the shelf labels 24 included in price-reduction list 84, to remove the record respective to the customer unit 22 from list 160 (FIG. 10) (step 314).

This information is used by the POS 14 to calculate the customers bill and charge the customer the reduced prices for purchases made in accordance with his personal list (step 316).

It will be appreciated by persons skilled in the art that numerous alternative embodiments based on the embodiments described hereinabove are possible. For example, the IR receivers 20 and 27 connected to check-in transceiver 20 and POS 14, respectively, may be replaced by an optical scanning device to read the contents of the customer unit's ID label 50. A bar code may be also used instead of the IR reception of the content of ID register 58 (FIG. 3).

The customer unit ID need not be read when entering the store and instead, the customer's personal price-reduction list 84 can be downloaded to POS 14, through IR receiver 27, at the checkout in order to calculate the correct price, thus eliminating the need for POS 14 to communicate with store computer 12 to retrieve the price-reduction list 84.

Instead of using IR links for communication between the components 26, 20, 27 and 18, a short-range, wireless communication link, such as short-range radio-frequency (RF) or ultrasonic signal may be used.

Instead of, or in addition to using a dedicated check-in infrared transceiver 20, the personal price-reduction list information may be downloaded from store computer system 12 into customer units 22 via transmitters 18.

The price reduction list 84 may be downloaded to each portable customer unit 22 and remain stored there, thereby eliminating the need for a check-in unit 16 and for the generation and downloading of a new price reduction list for each customer. Similar, for the second preferred embodiment, a price reduction list relating to each portable customer unit may be generated and stored in the store computer system.

It will be further appreciated by persons skilled in the art that the present invention is not limited to what has been particularly shown and described hereinabove. Rather the scope of the present invention is defined only by the claims which follow:

We claim:

1. A system for providing a customer within a store with personally associated prices for selected items from items offered for sale in said store, comprising:
   a portable unit associated with said customer, said portable unit being operative to obtain said personally associated prices for selected items;
   at least one point of sale for collecting payment for said customer's purchases, said at least one point of sale interfacing with said portable unit to calculate payment in accordance with said personally associated prices for selected items; and
   a plurality of electronic shelf labels, each displaying information associated with one of said items offered for sale in said store, said portable unit being effective to temporarily change said displayed information so as to display information related to said selected items.

2. The system according to claim 1, wherein said portable unit communicates with electronic shelf labels associated with said selected items to temporarily change said displayed information according to said personally associated prices for said selected items.

3. The system according to claim 1 and wherein each of said plurality of electronic shelf labels comprises means to attract the customer's attention to said selected items.

4. The system according to claim 1 and further comprising a store computer operative to select said selected items and to generate said personally associated prices.

5. The system according to claim 4 and wherein said store computer is operative to select said selected items and to generate said personally associated prices in accordance with data related to the customer's past purchase record.

6. The system according to claim 5 and wherein said store computer is operative for the storage of said customer's past purchase record.

7. The system according to claim 4 and further comprising at least one check-in unit linked to said computer system wherein each of said at least one check-in unit is operative to communicate with said portable unit to download thereto said personally associated prices for selected items.

8. A system according to claim 4 and further comprising at least one customer interface unit, operative to communicate with said store computer and to receive input from said customer to thereby affect the generation of said personally associated prices for selected items.

9. The system according to claim 1 and further comprising a store computer operative to select said selected items and to generate said personally associated prices wherein said store computer is operative to store general data related to each of said store items and to communicate with each of said electronic shelf labels to download said general data respective to each of said store items.

10. The system according to claim 9 and wherein said store computer is operative to communicate with each of said electronic shelf labels of said selected items to download thereto the identity of said portable unit and the respective personally associated price.

11. The system according to claim 1 and wherein said portable unit communicates with said at least one point of sale to upload said personally associated prices for selected items.

12. The system according to claim 1 and wherein said portable unit communicates with said at least one point of sale to transmit its identity.

13. A method for providing a customer, within a store having at least one point of sale, with personally associated prices for selected items, the method comprising the steps of:
   providing said customer with a portable unit;
   downloading item-specific information to each of a plurality of electronic shelf labels, wherein each of said electronic shelf labels is associated with one of said store's items;
   displaying said item-specific information on the respective electronic shelf label;
   generating said personally associated prices for selected items, for said customer;
   temporarily changing the information displayed on said respective electronic shelf labels to said personally associated prices for selected items upon receiving a communication from said portable unit; and
   upon completion of purchase and presentation of said portable unit, charging said customer in accordance with said personally associated prices for selected items purchased.

14. A method according to claim 13 and wherein said step of displaying includes the step of generating an eye catching signal to attract said customer's attention.

15. A method according to claim 13 and further comprising the step of storing said personally associated prices for selected items in a store computer in said store.

16. A method according to claim 13 and further comprising the steps of:
   a. providing said portable unit with identification;
   b. communicating said identification and said personally associated prices for the respective selected items to each of the said respective electronic shelf labels; and
   c. temporarily changing said displayed information on said respective electronic shelf label to display said personally associated prices upon said portable unit communicating said identification.

17. A method according to claim 13 and further comprising the steps of:
   a. downloading said personally associated prices to said portable unit;
   b. said portable unit communicating said personally associated prices for the respective selected items to each of the said respective electronic shelf labels; and
   c. temporarily changing said displayed information on said respective electronic shelf label to display said personally associated prices upon receiving a communication of said personally associated prices from said portable unit.

18. A method according to claim 13 wherein said step of temporarily changing the displayed information is automatic.

* * * * *